(12) United States Patent
Venot et al.

(10) Patent No.: US 9,211,034 B2
(45) Date of Patent: Dec. 15, 2015

(54) UTENSIL WITH SIMPLIFIED HANDLING

(75) Inventors: Marc Venot, Saint Quen (FR); Mathieu Lion, Paris (FR)

(73) Assignee: Mastrad, S.A., Paris (FR)

( * ) Notice: Subject to any disclaimer, the term of this patent is extended or adjusted under 35 U.S.C. 154(b) by 638 days.

(21) Appl. No.: 13/519,538

(22) PCT Filed: Dec. 27, 2010

(86) PCT No.: PCT/FR2010/000879
§ 371 (c)(1),
(2), (4) Date: Oct. 12, 2012

(87) PCT Pub. No.: WO2011/080425
PCT Pub. Date: Jul. 7, 2011

(65) Prior Publication Data
US 2013/0025470 A1 Jan. 31, 2013

(30) Foreign Application Priority Data
Dec. 31, 2009 (EP) .................................... 09291003

(51) Int. Cl.
*A47J 37/12* (2006.01)
*A47J 36/20* (2006.01)
*A47J 45/07* (2006.01)

(52) U.S. Cl.
CPC ................ *A47J 36/20* (2013.01); *A47J 45/071* (2013.01)

(58) Field of Classification Search
CPC ................................ A47J 36/20; A47J 45/071
USPC ............ 99/324, 409, 422, 485, 495; 220/200, 220/212, 254.1, 254.3, 260, 574, 694, 735, 220/752, 756, 759, 771, 780, 912
See application file for complete search history.

(56) References Cited

U.S. PATENT DOCUMENTS

| 6,711,992 B1 * | 3/2004 | McLemore ..................... 99/413 |
| 8,820,222 B2 * | 9/2014 | Cloutier et al. ................. 99/352 |
| 2006/0070944 A1 * | 4/2006 | Ahn et al. ..................... 210/470 |

FOREIGN PATENT DOCUMENTS

| GB | 2 451 142 | | 1/2009 |
| JP | 2006129968 | * | 5/2006 |
| WO | WO 2008/036785 | | 3/2008 |

* cited by examiner

*Primary Examiner* — Dana Ross
*Assistant Examiner* — Joseph Iskra
(74) *Attorney, Agent, or Firm* — Novak Druce Connolly Bove + Quigg, LLP

(57) ABSTRACT

The invention relates to a kitchen utensil, comprising a base (4) including a bottom (14) and a peripheral wall (16) defining a space (18). The wall (16) has an edge (20) opposite said bottom (14) and two through-openings (22-24) in the vicinity of the edge (20), opposite one another. A container (10) is suitable for being housed in said space (18). Said container has two opposite peripheral lugs (44-46), received in one of the through-openings (22-24). At least one (24) of said through-openings (22-24) leads onto the edge (2) into a notch (28) for receiving one of said lugs (44). A grasping device (6) is provided with a bearing portion (8) at least partially covering the lug (44) that it receives. A fastening element (8) maintains the grasping device (6) in the position in which the lug (44) is at least partially covered.

10 Claims, 12 Drawing Sheets

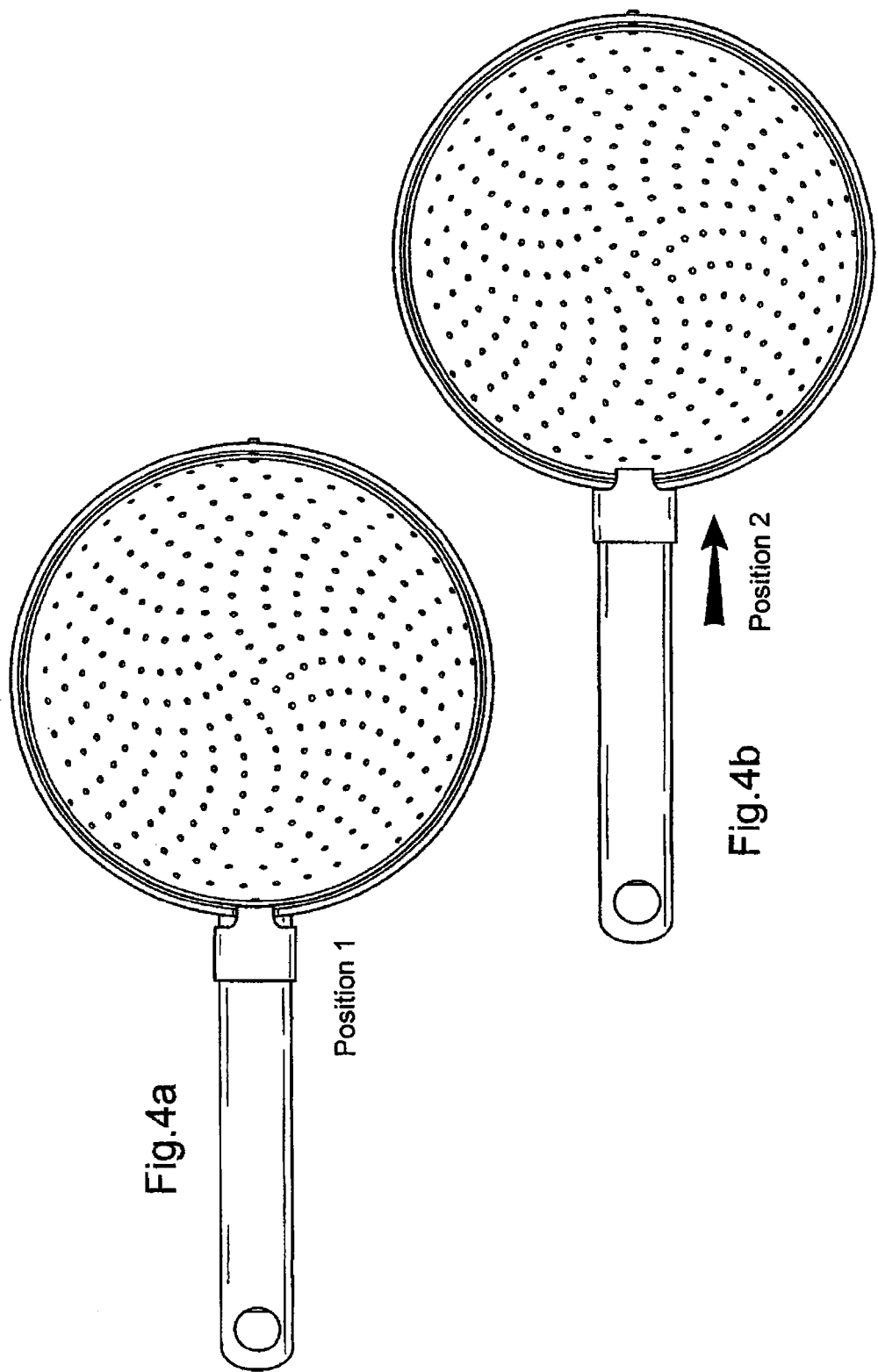

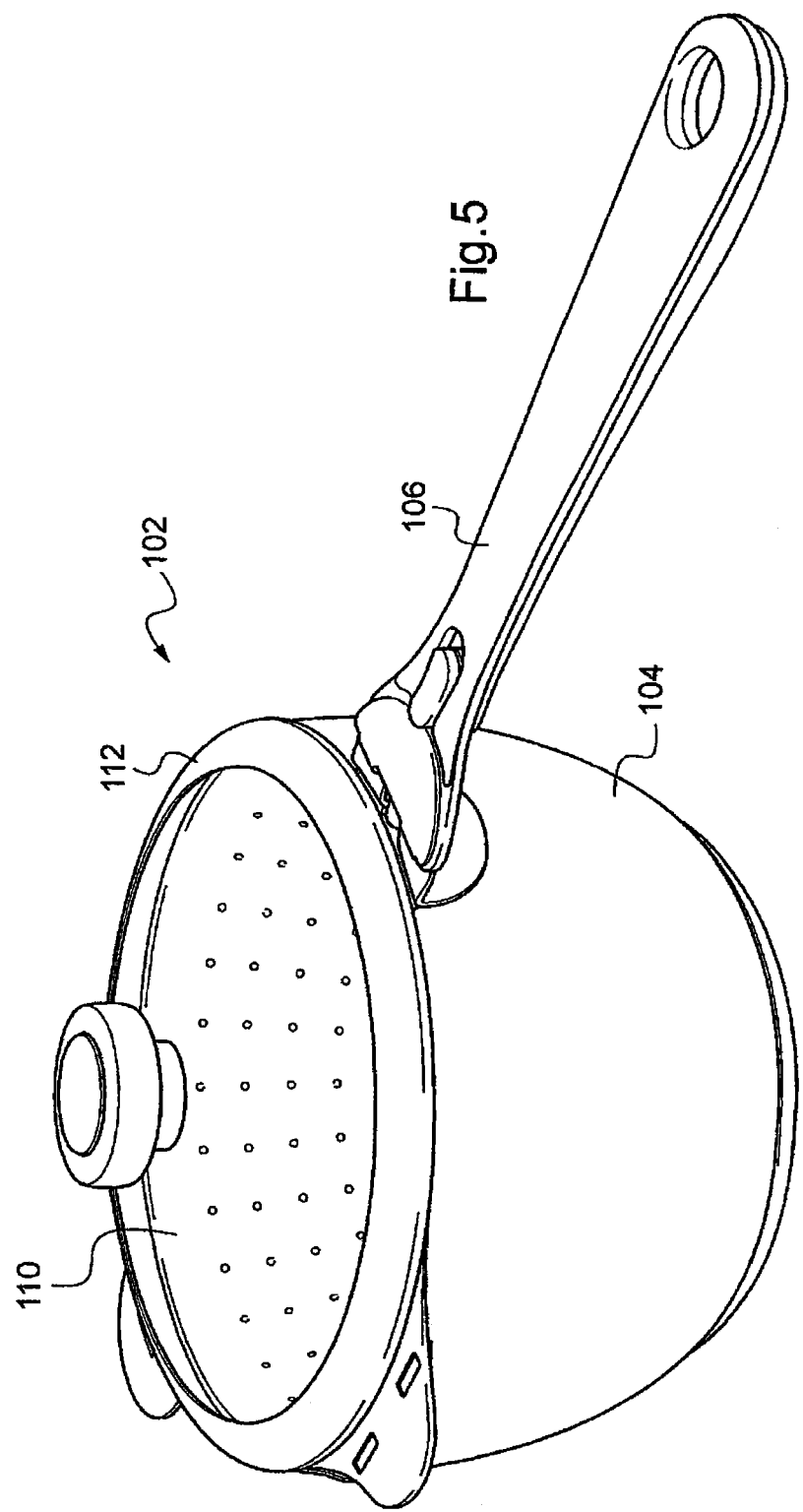

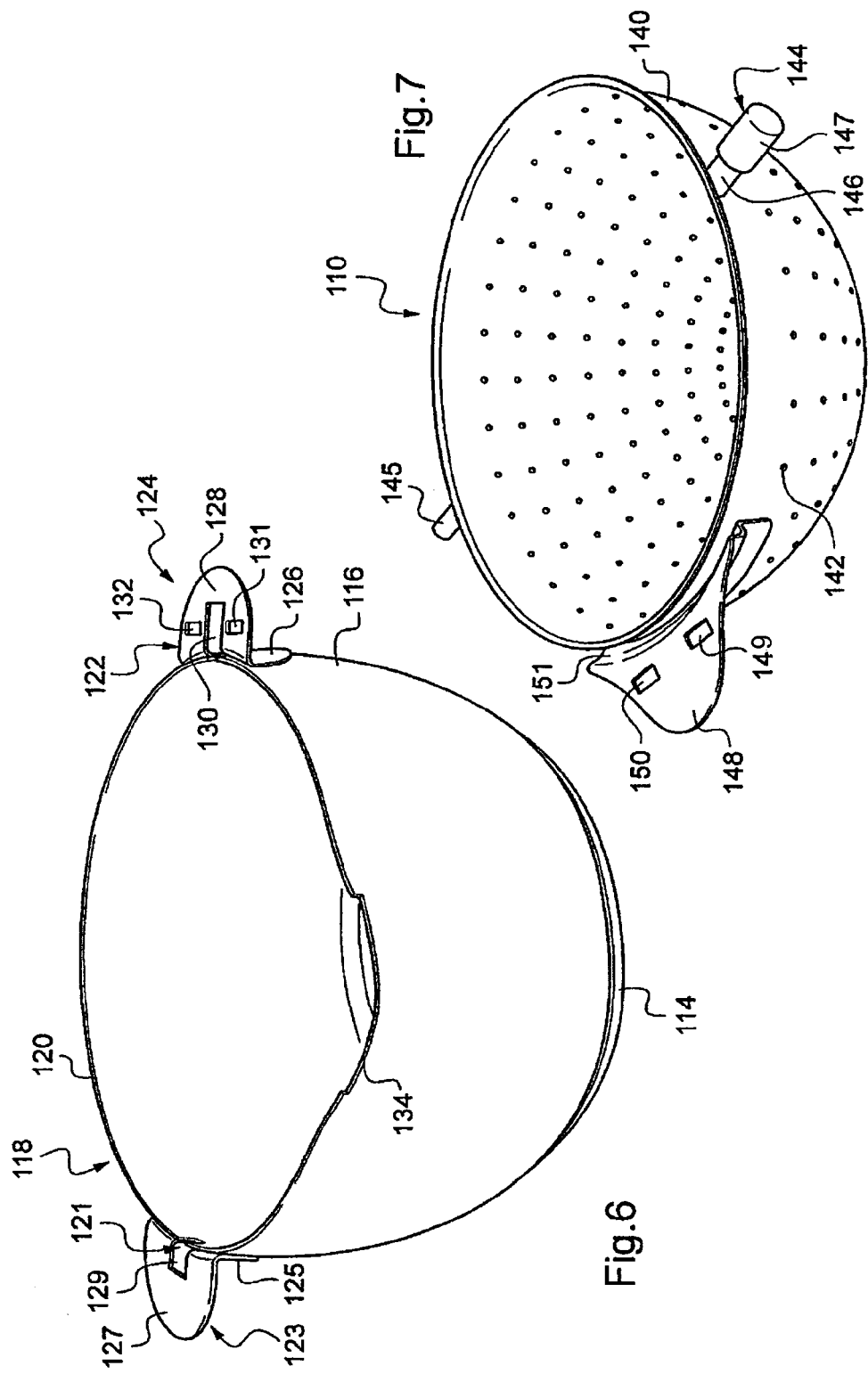

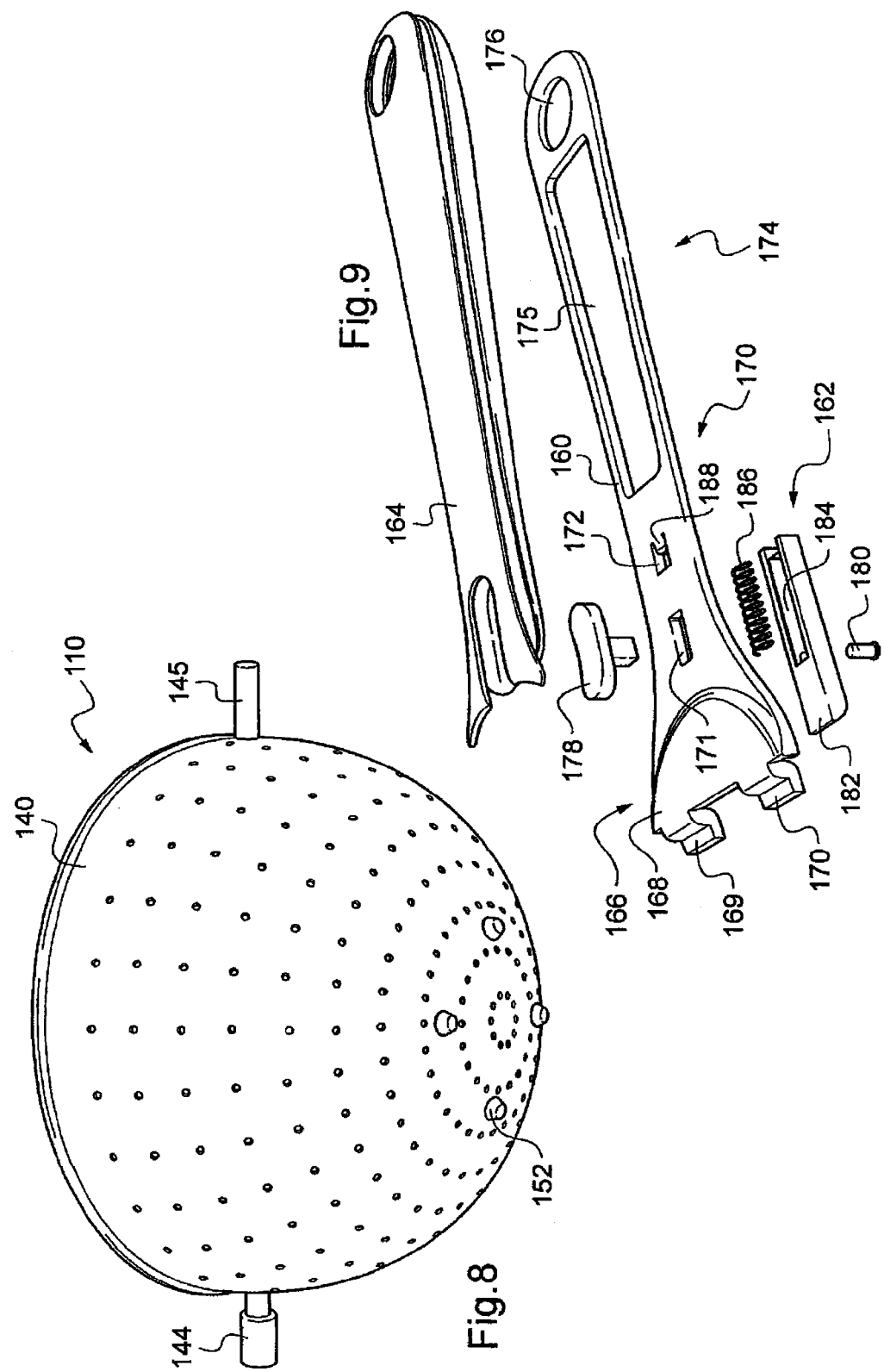

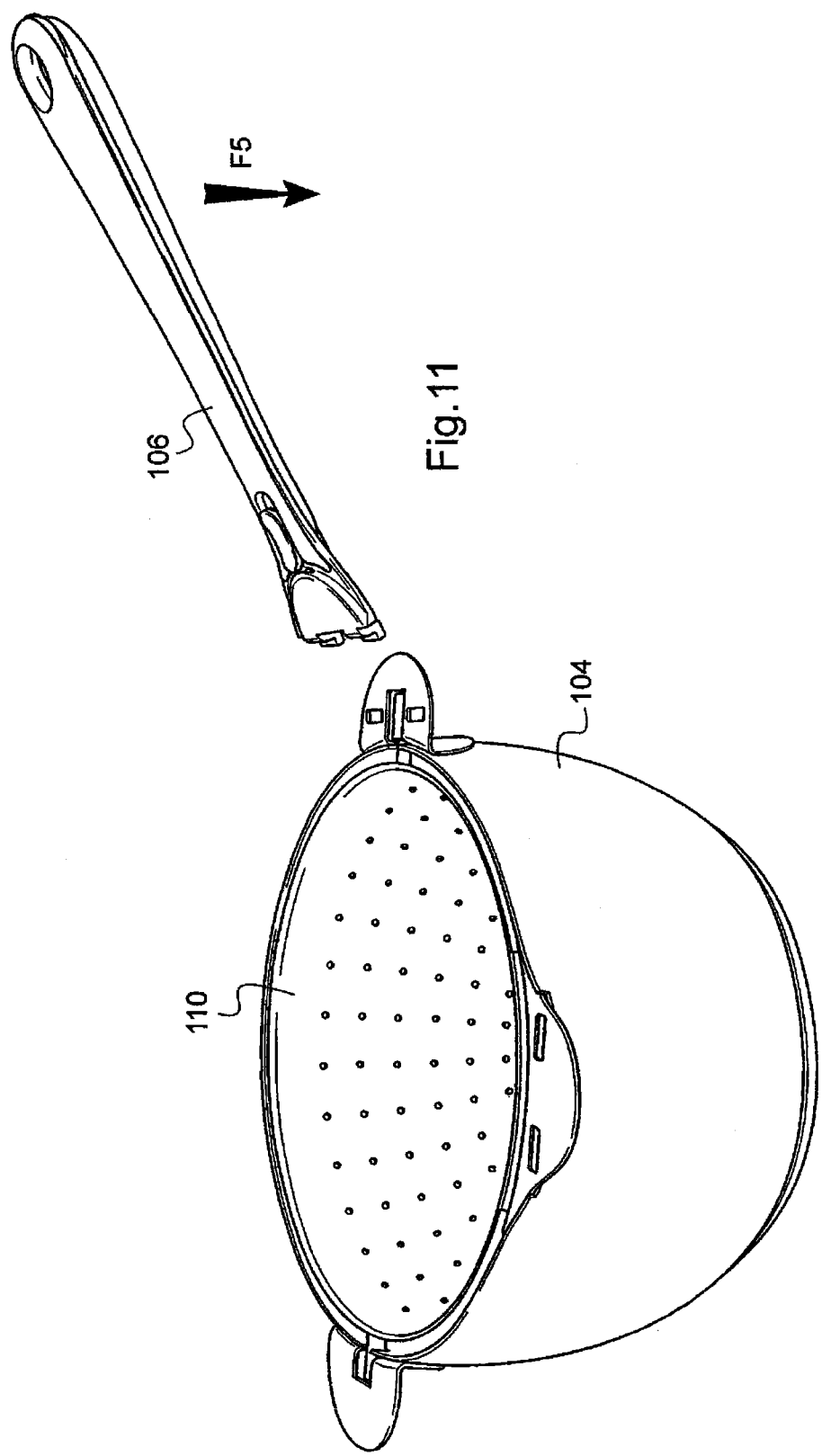

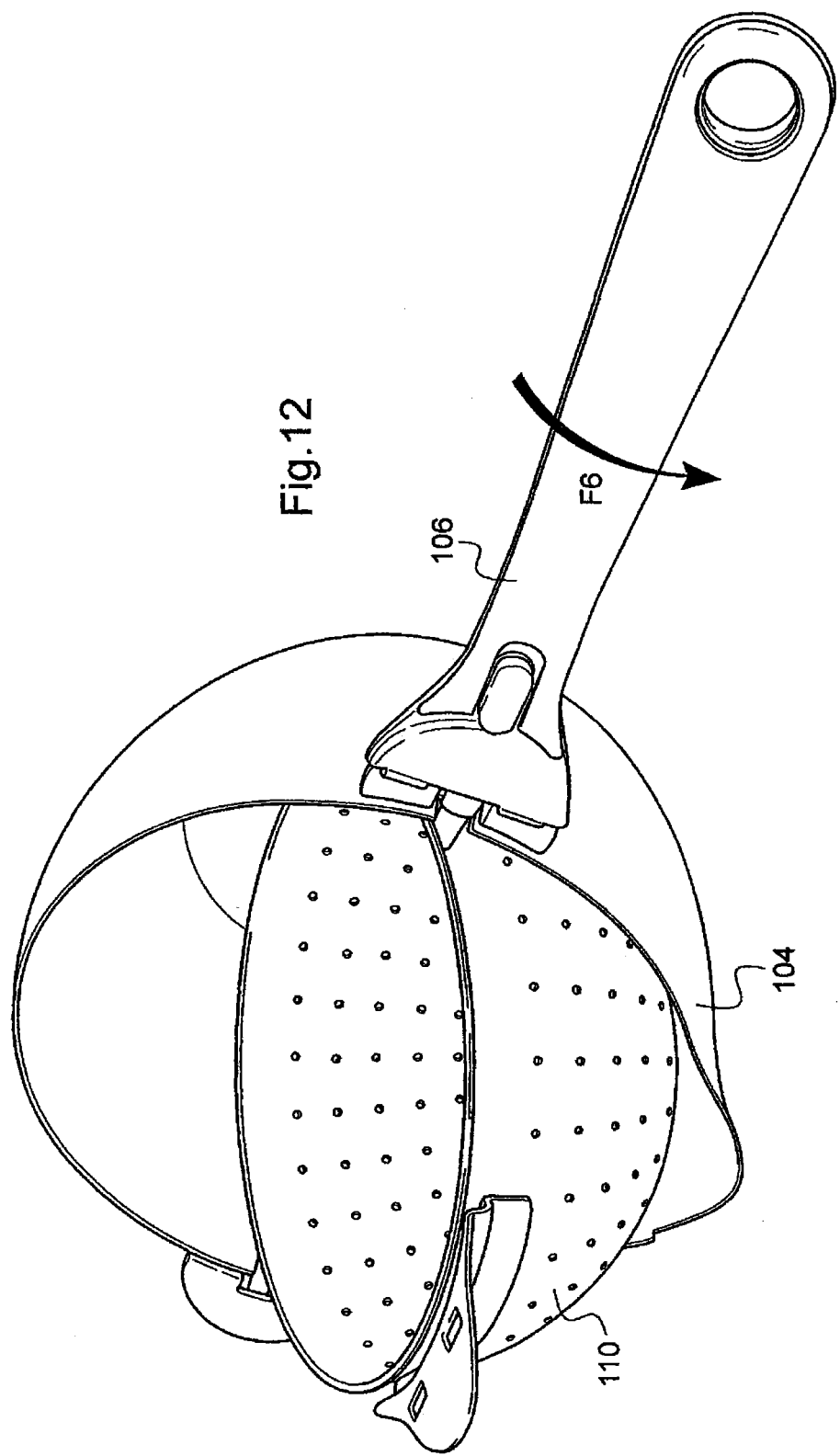

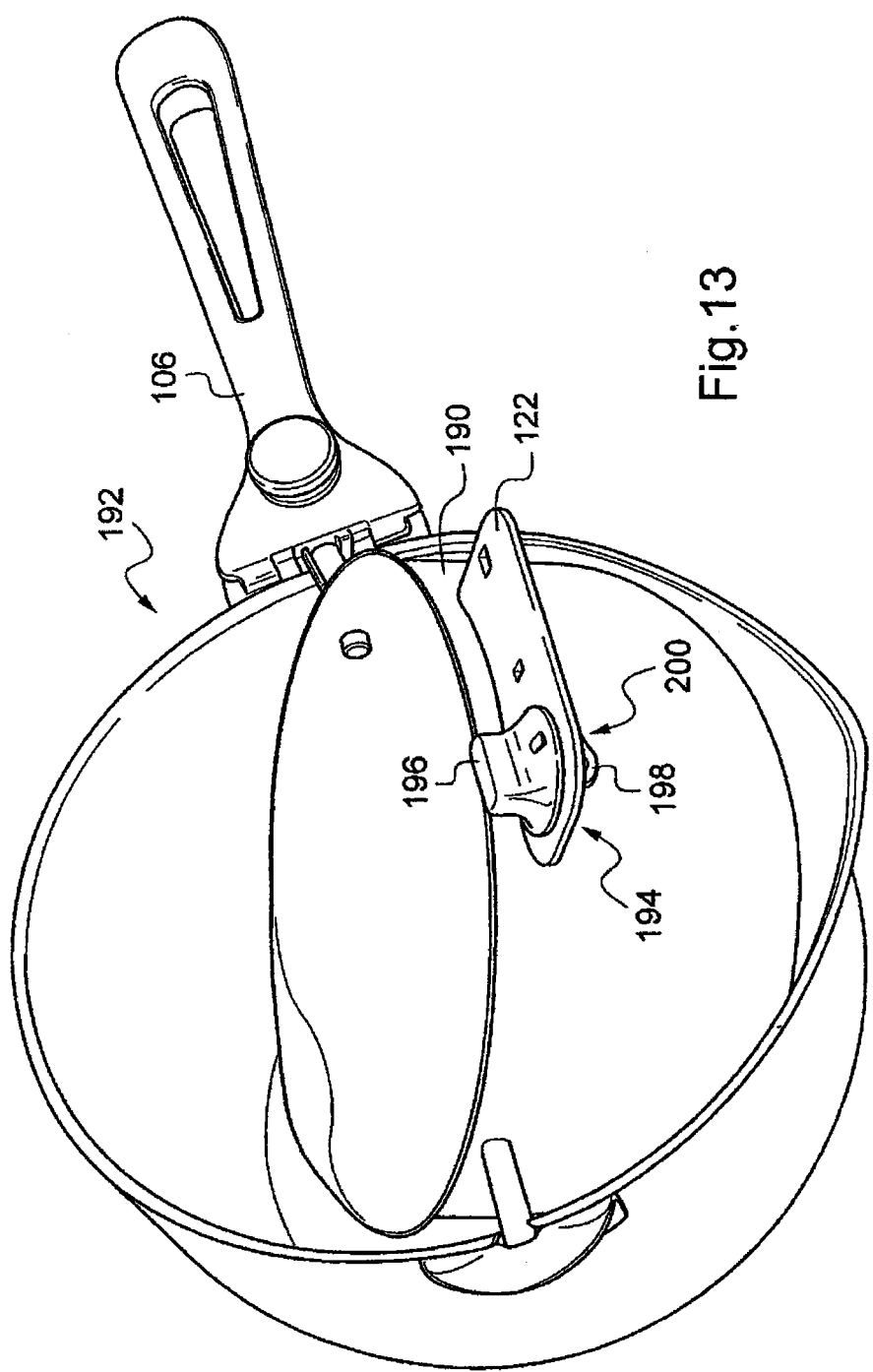

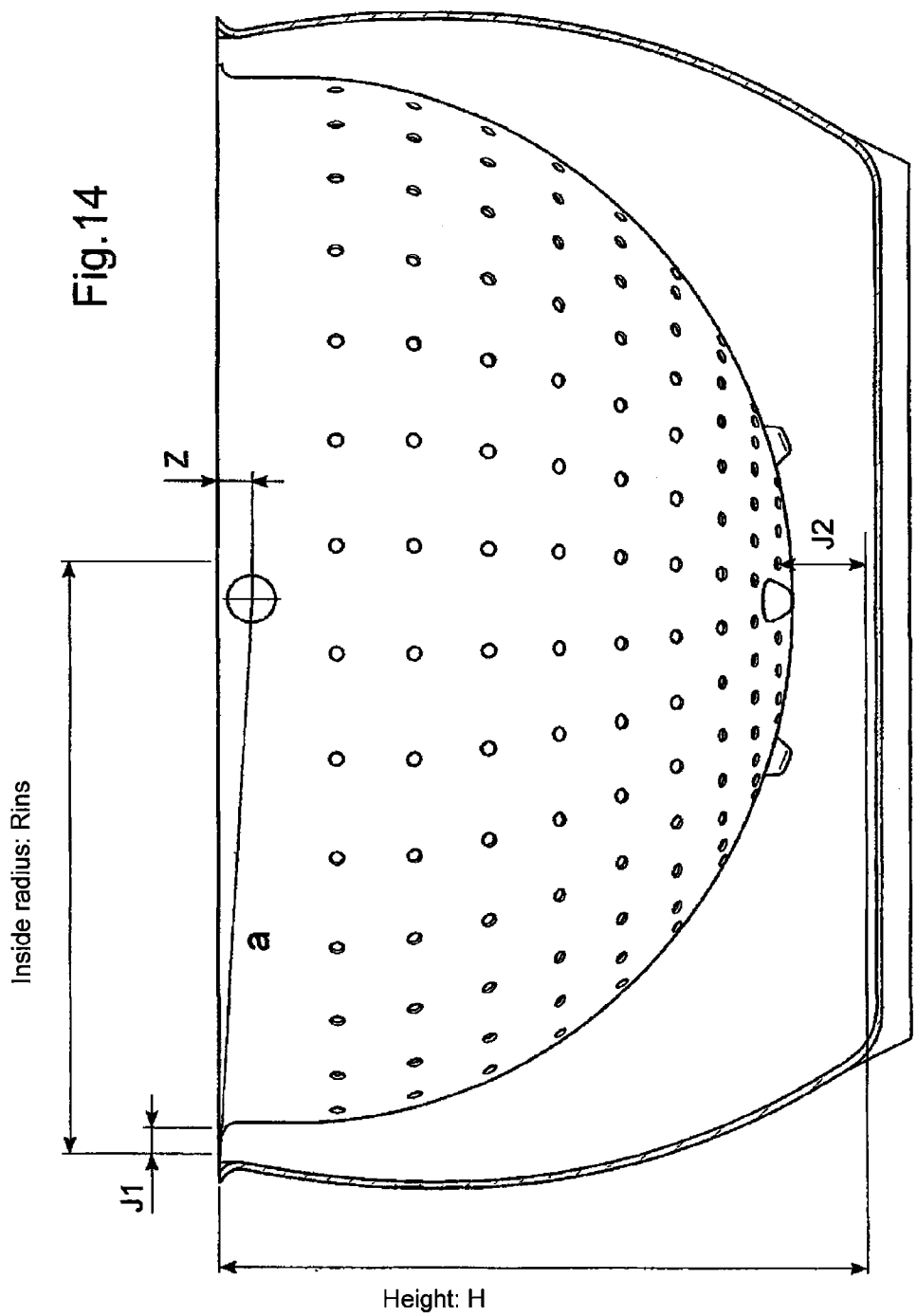

UTENSIL WITH SIMPLIFIED HANDLING

CROSS-REFERENCE TO RELATED APPLICATION

This application is a national stage application (under 35 U.S.C. §371) of PCT/FR2010/000879, filed Dec. 27, 2010, which claims the benefit of European application no. 09291003.3, filed Dec. 31, 2009, the contents of each of which are incorporated by reference in their entireties.

FIELD OF THE INVENTION

The invention relates to a utensil with simplified handling.

BACKGROUND

Cooking involves the use of different utensils in order to carry out different cooking methods.

In some cases, these different cooking methods involve the use of water as heat carrier. To that end there is often used a utensil having a base which receives the cooking water, as well as a container which receives the food to be cooked.

Once cooking is finished, the water must be drained off. The operation for draining off the water is generally complex and not very practical.

This operation in fact requires a certain degree of precision in order not to drain off the food at the same time as the cooking water, while the utensil is red-hot, which makes this action very difficult.

Solutions have been proposed for remedying this deficiency. They consist mainly in providing the base with peripheral lugs and the container with corresponding notches.

This makes it possible to establish a connection with a degree of freedom of rotation between the base and the container. It thus becomes possible to drain off the water without the risk of pouring out the cooked food.

However, this solution is not very practical in use. Fitting of the container into the base is difficult and relatively unstable.

Furthermore, this solution requires a very particular configuration of the elements of the utensil, which puts a strain on the production of such utensils, both from the material point of view and from the point of view of complexity of production.

The invention will improve the situation.

BRIEF SUMMARY

To that end, the invention proposes a utensil comprising a base having a bottom and a peripheral wall which is joined to said bottom so as to define a space, said wall having a rim substantially opposite said bottom as well as two through-openings in the vicinity of said rim, substantially opposite one another.

The utensil further comprises a container which is suitable for being accommodated in said space and has two peripheral lugs which are substantially opposite one another and are suitable for being received each in a respective opening of said through-openings.

At least one of the through-openings opens at the rim in a receiving notch for one of said lugs, and in that the utensil further comprises a grasping device provided with a support portion suitable for covering at least partially the lug that it receives, and a fixing element suitable for maintaining the grasping device in the position in which the lug is at least partially covered.

This device is particularly advantageous because it is simpler to manufacture and use, and it is more reliable.

BRIEF DESCRIPTION OF THE DRAWINGS

Other features and advantages of the invention will better become apparent upon reading the following description, taken from examples which are given by way of illustration and without implying any limitation and taken from the drawings, in which:

FIG. 5 shows a perspective view of a second embodiment of a utensil according to the invention, FIG. 6 shows a perspective view of the base of the utensil of FIG. 5, FIG. 7 shows a perspective side view of a first container of the utensil of FIG. 5, FIG. 8 shows a perspective bottom view of the container of FIG. 7, FIG. 9 shows an exploded perspective view of a handle of the utensil of FIG. 5, FIG. 11 shows a perspective view of a second step of the assembly of the utensil of FIG. 5, FIG. 12 shows a perspective view of the draining of cooking water using the utensil of FIGS. 1 and 2, FIG. 13 shows another embodiment of the utensil of FIG. 5, and FIG. 14 shows a cutaway front view of the utensil of FIGS. 5 and 13.

The drawings and the description below substantially contain elements of a specific nature. They may therefore not only serve for better understanding of the present invention, but also contribute to the definition thereof, where appropriate.

DETAILED DESCRIPTION OF THE PREFERRED EMBODIMENTS

Figure 1:
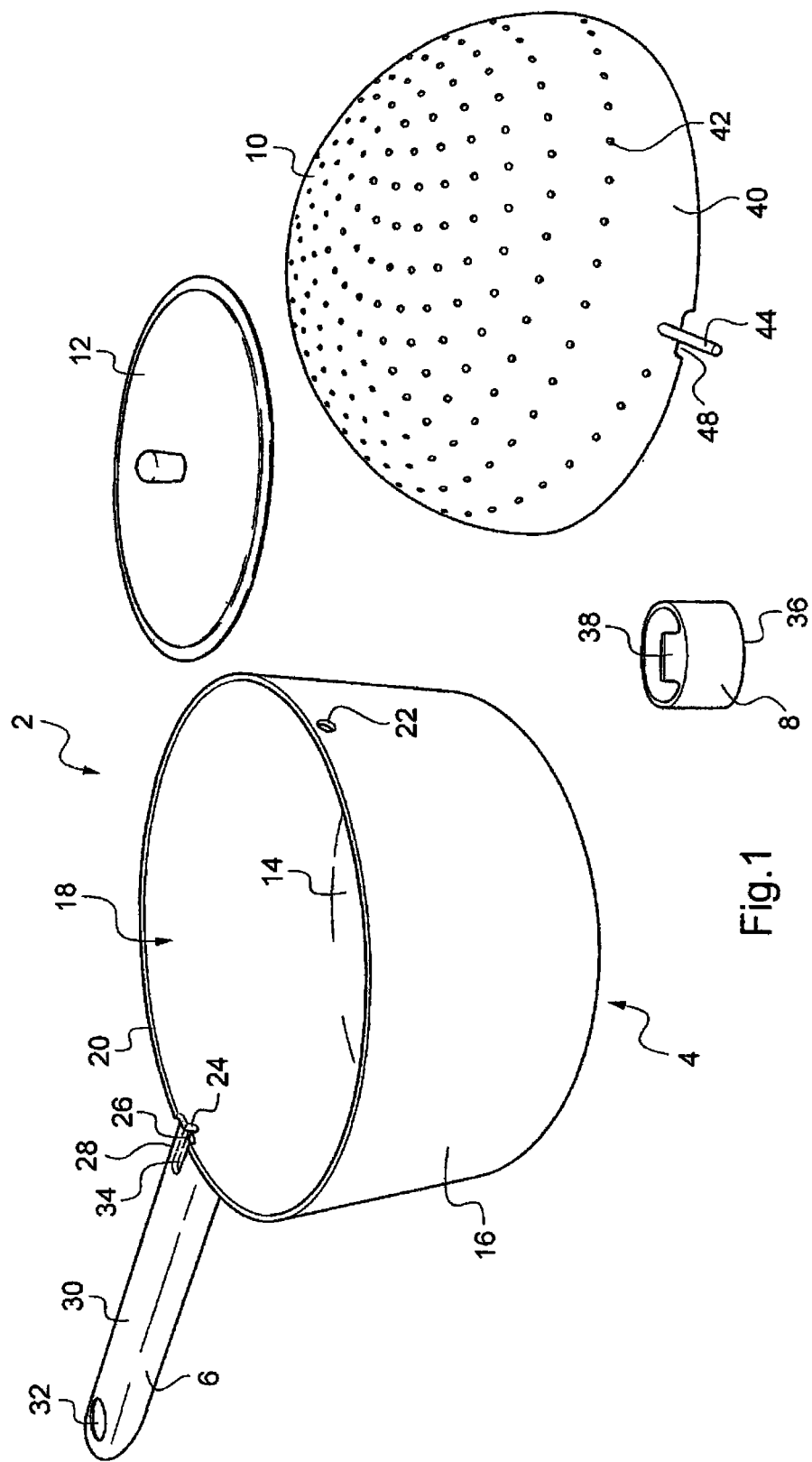
FIG. 1 shows an exploded view of a first embodiment of a utensil according to the invention.

FIG. 1 shows an exploded perspective view of a utensil 2 according to the invention. In the example described here, the utensil 2 comprises a base 4 provided with a handle 6, a sleeve 8, a strainer 10 and a lid 12.

In the example described here, the base 4 is in the form of a saucepan. More precisely, the base 4 has a substantially flat and substantially circular bottom 14 on which there rests a substantially straight peripheral wall 16 which follows the contours of the bottom 14.

Together, the bottom 14 and the wall 16 define a space 18 for receiving food which is to be cooked, or a container.

In the embodiment described here, the bottom 14 and the wall 16 are produced from the same sheet, by stamping. In other embodiments, however, the bottom 14 and the wall 16 can be joined by welding, for example.

Furthermore, numerous other shapes can be used for the bottom 14 and the wall 16. For example, the bottom 14 can be substantially square, elliptical or of any other closed shape, and the wall 16 can be not straight.

Generally, the bottom 14 can also be rounded, that is to say convex or concave, and the wall 16 can be joined to the bottom 14 on the inside thereof and not along its periphery as is the case in the example described here.

The important thing is that the bottom 14 defines a receiving surface and the wall 16 delimits a containing surface.

The upper end of the wall 16 defines a rim 20. The rim 20 is substantially opposite the bottom 14 relative to the wall. The rim 20 is required especially when a liquid or food received in the space 18 is being drained off.

In the example described here, the wall 16 has two openings 22 and 24 in the vicinity of the rim 20. The openings 22 and 24 are formed substantially opposite one another.

More precisely, since the bottom 14 is substantially circular in shape and the wall 16 follows that shape, the openings 22 and 24 are formed in the wall 16 so that they are substantially diametrically opposite.

The opening 24 is formed in the wall opposite the handle 6, which serves as a grasping device with the sleeve 8. Because the handle 6 is fixed to the wall 16 after the openings 22 and 24 have been formed, it is also possible for the handle to be fixed opposite the opening 24.

In the embodiment described here, the opening 22 is formed very close to the rim 20, 10 mm therefrom, and with a diameter of 8 mm, so that it does not merge into the rim 20. The openings 22 and 24 are formed at substantially the same distance from the rim 20.

In other embodiments, the opening could be formed at a greater distance from the rim 20, up to half the distance between the rim 20 and the bottom 14.

The opening 24 is different from the opening 22 and opens via an enlargement 26 on the rim 20 to form a notch 28. The enlargement of the notch 26 is relative to the opening 22.

In the example described here, the handle 6 is in the form of an elongate stamped member 30, one end of which is fixed to the wall 16. At the other end, the stamped member 30 has an aperture 32 for hanging the base 4 from a hook.

On the side of the end that is fixed to the wall 16, the stamped member 30 has a groove 34 which is arranged substantially opposite the opening 22.

The end of the stamped 30 is fixed to the wall 16 at a distance from the rim 20 which is greater than the height of the enlargement 26. Thus, when the base 6 is placed on a flat surface, the upper surface of the handle 6 skims the level of the enlargement 26 of the notch 28.

The bottom 14 and the wall 16 can be made in "three-ply" (superposition of three layers of material, used in particular for induction heating), steel, aluminium, stainless steel, anodised aluminium or of moulded steel.

The handle 6 can be made of steel, stainless steel, moulded steel, alloy, aluminium or any other heat-resistant material and may or may not be covered with a soft grip.

The handle 6 can be fixed to the wall 16 by welding, screwing, riveting, adhesive bonding, clipping or any other assembly technique.

The sleeve 8 has a shape which corresponds substantially to the shape of the handle 6 onto which it will be fitted.

The sleeve 8 therefore comprises a substantially cylindrical body 36 which is provided at an axial end with a tab 38. The width of the tab 38 is advantageously slightly smaller than the width of the notch 28.

Accordingly, when the sleeve 8 is fitted onto the handle 6, the tab 38 is able to fit into the enlargement 26 of the notch 28, just above the opening 22 and the groove 36, which it obstructs.

The strainer 10 is the container which is to receive the food which is to be cooked. It has a body 40 which has an open, hemispherical shape.

The body 40 is pierced with a large number of holes 42 in order to allow water to enter, and two lugs [or spindles] 44 and 46, only one of which, lug 44, is visible in FIG. 1. Part of the lug 46 can be seen in FIG. 3.

It will be noted that, if the holes 42 are not formed in the body 40, there is advantageously obtained a bain-marie.

The lug 44 has a substantially cylindrical shape and a diameter corresponding to that of the groove 34, so that the groove 34 is able to receive the lug 44. The lug 46 has a substantially cylindrical shape and a diameter corresponding to that of the opening 22, so that it can be introduced into the opening 22.

The body 40 also has a cut-out 48 in the region of the lug 44, which cut-out 48 has a shape substantially identical to that of the enlargement 26 of the notch 28 of the wall 16.

Figure 2:
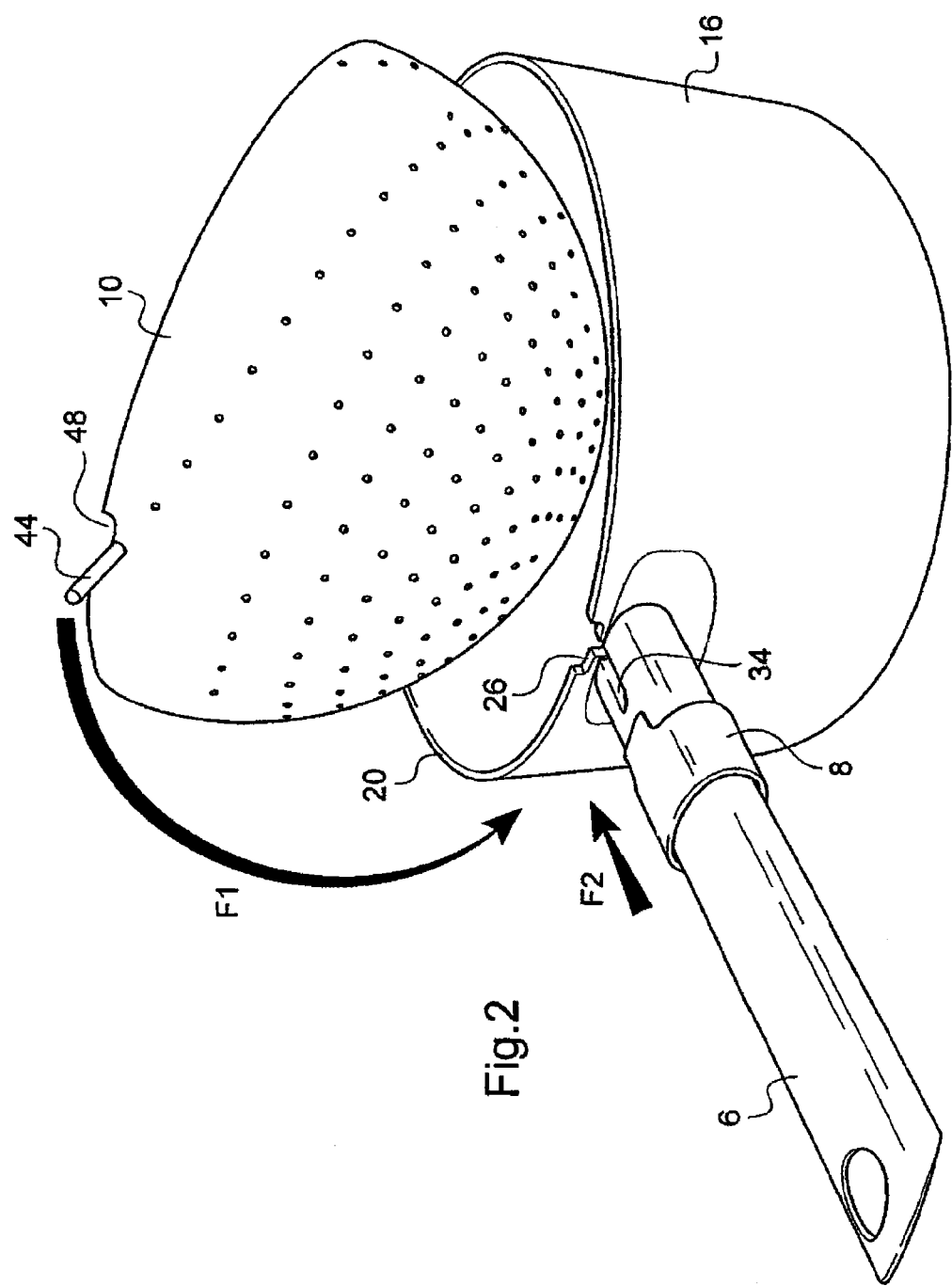
FIG. 2 shows a perspective view of the assembly of the utensil of FIG. 1.

FIG. 2 shows an example of the assembly of the container 10 in the base 4. The lug 46 is first introduced into the opening 22.

Then, in a movement shown by an arrow F1, the container 10 is lowered into the space 18 until the lug 44 becomes lodged in the groove 34.

The shape of the notch 28 facilitates this movement, and the lug 44 is in its final position received in the opening 24 and as a continuation thereof in the groove 34. Finally, the sleeve 8 can be fitted onto the stamped member 30 until it covers the groove 34, in a movement shown by an arrow F2.

Figure 3:
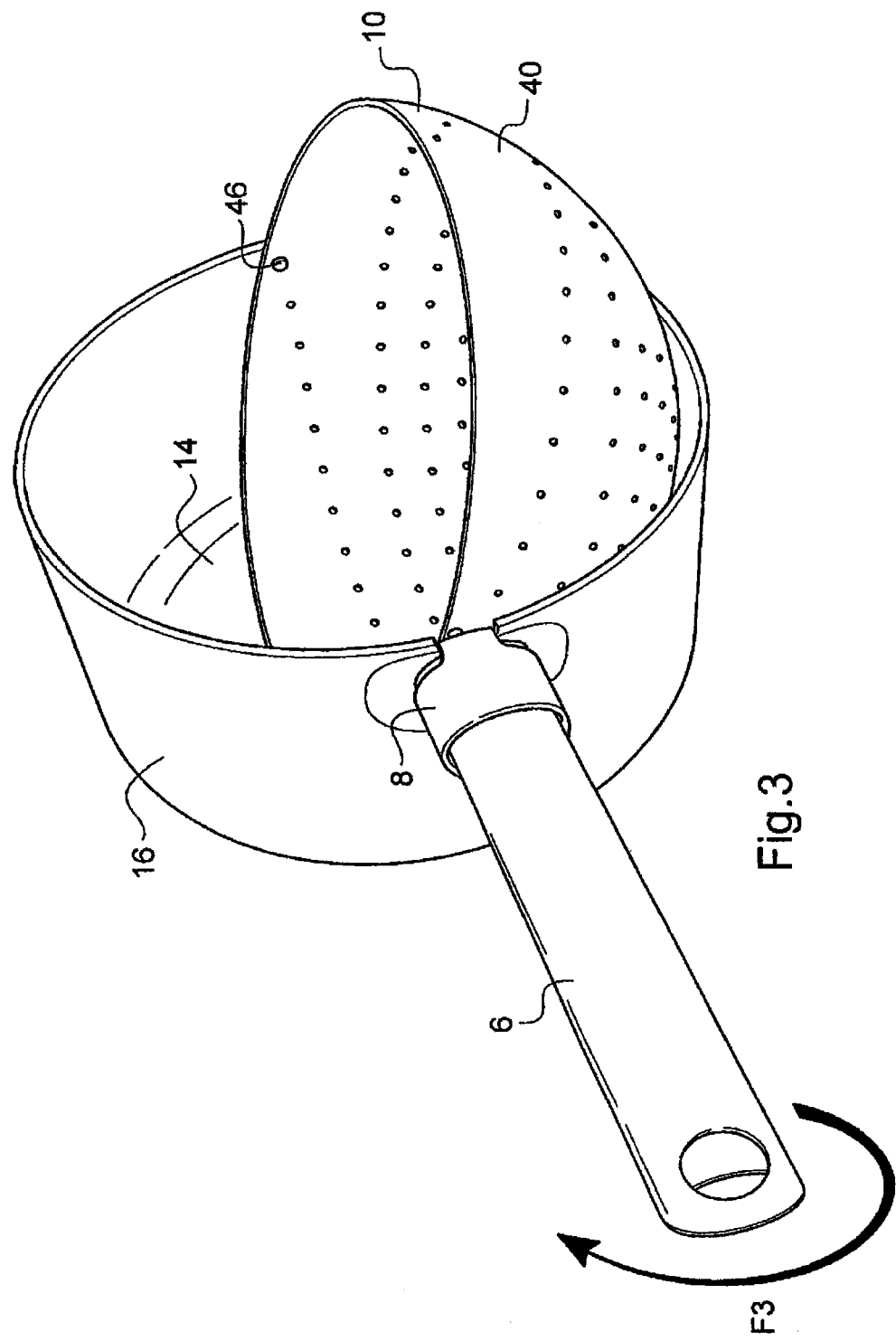
FIG. 3 shows a perspective view of the draining of cooking water using the utensil of FIGS. 1 and 2, FIG. 4a and FIG. 4b show top views of the utensil of FIG. 1 in two positions of the handle.

Once the container 10 has been assembled on the base 4 and the sleeve 8 has been fitted onto the handle 6, a utensil 2 according to FIG. 3 is obtained.

Since the lug 44 is received in the opening 24 and is covered by the sleeve 8, and the lug 46 in the opening 22, the container 10 is in a rotational relationship relative to the base 4.

Accordingly, if the base 4 is rotated according to an arrow F3, the base 4 will gradually be turned about a substantially horizontal axis, and the container 10 will remain in place under the effect of gravity.

The result is that the water contained in the base 4 can be emptied out without presenting a problem for the food contained in the container 10.

Furthermore, by virtue of the utensil according to the invention, that operation can be performed with one hand, without any risk of the user burning himself by coming close to the base 4.

FIGS. 4a and 4b show top views of the utensil in two configurations.

In the configuration of FIG. 4a, the sleeve 8 has been pushed on to the same level as shown in FIG. 3. In this configuration, the container 10 is free to rotate.

In the configuration of FIG. 4b, the sleeve 8 has been fitted slightly further. As a result, the tab 38 of the sleeve 8 will enter the cut-out 48 of the container 10, which will prevent the container 10 from rotating relative to the base 4.

Accordingly, still using only one hand and without any risk of being burned, the user is able to change the utensil from a locked position, in which the base 4 and the container 10 are connected, to a free position, in which the user is able to drain off the water.

It will be noted that the utensil 2 is ambidextrous, and that the openings 22 and 24 may be offset slightly, that is to say generally but not diametrically opposite one another.

FIG. 5 shows a perspective view of a utensil according to a second embodiment of the invention.

Here too, the utensil 102 has a base 104, a handle 106, a container 110 and a lid 112. This embodiment does not have a sleeve because it functions differently.

FIG. 6 shows a perspective view of the base 104. Like the base 4, the base 104 has a bottom 114 joined to a wall 116, which together define a space 118.

The wall 116 is slightly different in shape from the wall 16 and has a slightly rounded shape, so that the base 104 resembles a salad bowl.

As has been mentioned above for the wall 16, the bottom 114 and the wall 116 can be produced in different ways and with different shapes.

The wall 116 likewise has a rim 120 opposite the bottom 114, as well as two openings 121 and 122. In this second embodiment, the openings 121 and 122 open at the rim 120 to form notches. The notch 121 is formed with a greater width than that of the notch 122.

The base 114 also has two loop handles 123 and 124 which are attached to the wall 116, opposite the notch 121 in the case of the loop handle 123 and opposite the notch 122 in the case of the loop handle 124.

The loop handle 123 (or 124) has the shape of a corner piece, a first surface 125 (or 126) being used for fixing to the wall 116 by welding, screwing, riveting, adhesive bonding or any other assembly technique, and a second surface 127 (or 128), which is substantially perpendicular to the first surface 125 (or 126), being a continuation of the rim 120, substantially at the same level as the rim 120.

The second surface 127 of the loop handle 123 has a cut-out 129, the width of which corresponds substantially to the width of the notch 121 of the wall 116.

The second surface 128 of the loop handle 124 has a cut-out 130, the width of which corresponds substantially to the width of the notch 122 of the wall 116. It also has two cut-outs 131 and 132 arranged on either side of the cut-out 130, the purpose of which will be explained below.

Finally, approximately at mid-distance between the two loop handles 123 and 124, the rim 120 has a spout 134 which can serve to facilitate pouring of a liquid contained in the space 118.

FIG. 7 shows a first perspective view of the container 110. In the example described here, the container 110 is quite similar to the container 10 in that it has a body 140 pierced with holes 142 to form a strainer, as well as lugs 144 and 145. Here too, it will be possible to omit the holes 142 in order to obtain a bain-marie.

The lug 144 has a first cylindrical portion 146, which projects from the body 140, and a second portion 147, which is likewise cylindrical, as a continuation of the first portion 146.

The first portion 146 has a diameter substantially equal to that of the opening 122, and the second portion 147 has a diameter substantially equal to that of the cut-out 130.

The lug 145 in turn is formed of a single cylindrical part, the diameter of which corresponds substantially to that of the opening 121.

Advantageously, the diameters of the openings 121 and 122 can be chosen to be substantially equal, which facilitates manufacture of the container 110. In fact, the openings 121 and 122 can be formed in the same operation, like the lug 145 and the first portion 146 of the lug 144.

The configuration of the lugs 144 and 145 facilitates fitting of the container 110 in the base 104. In fact, as will be seen below, the utensil of this embodiment is not ambidextrous.

Within this context, the different sizes of the lugs 144 and 145 ensure that the user does not make a mistake when positioning the container 110 in the base 104.

The container 110 also has an element 148 of generally bent shape, like the loop handles 123 and 124, and which is arranged along the body 140 between the lugs 144 and 145, corresponding to the spout 134 of the base 104.

The element 148 is arranged between the lugs 144 and 145 in such a manner that, when the container 110 is received in the space 118 of the base 104, the element 148 rests on the spout 134. The support of the element 148 on the spout 134 accordingly prohibits a direction of rotation of the container 110 relative to the base 104, while that support is ineffective in the other direction of rotation.

The element 148 also has two cut-outs 149 and 150 which are formed in a similar manner to the cut-outs 131 and 132 of the loop handle 124.

The element 148 is formed with a gap 151 in the region of the bend. Accordingly, when the element 148 is joined to the wall 116, a space corresponding to the gap 151 remains between on the one hand the end of the rim 120 of the wall 116 and on the other hand the element 148. This especially allows the lid 112 to be fitted tightly, whether the strainer 10 is present in the base 104 or not.

It will additionally be noted that the cut-outs 149 and 150 are formed in a part of the element 148 that cannot be covered by the lid 112, as will better be apparent from FIG. 5.

When the container 110 is received in the base 104 and the lid 112 closes the utensil 102, the inside of the utensil 102 is therefore in communication with the outside via the cut-outs 149 and 150, since they are formed in a part of the element 148 that covers the spout 134 between the end thereof and the end of the lid 112.

Accordingly, when the element 148 is resting on the spout 134 and the lid 112 closes the assembly, the cut-outs 149 and 150 allow steam to escape from inside the utensil 102, which is closed by the lid 112.

This ensures that there is an easy escape path for the steam and prevents steam from escaping through the openings 121 and 122 and therefore burning the user who is handling the utensil 102.

As will be seen in FIG. 8, the container 110 further has four feet 152 in the region of the bottom of the body 140, which allows the container 110 to be placed on a flat surface without tipping over.

FIG. 9 shows an exploded perspective view of the handle 106 of the utensil 102. The handle 106 is removable and is provided to allow the base 104 and the container 110 to be handled, both separately and when they are joined together.

The handle 106 has a core 160, a locking mechanism 162 and a cover 164.

The core 160 is made of metal, for example of steel for die casting, and has a generally elongate shape. On the side of the handle 106 that is used for joining to the base 104 or to the container 110, the core has a joining region 166.

The joining region 166 comprises a stamped portion 168, the shape of which is substantially complementary to that of the second portion 128 of the loop handle 124, and to that of the element 148.

Furthermore, two fingers 169 and 170 project from the end of the stamped portion 168. The fingers 169 and 170 are of such a size and are so arranged that they engage in the cut-outs 131 and 132 and 149 and 150.

Following the joining region 166, the core 160 has a locking region 170. The locking region 170 is the portion of the core 160 that is to cooperate with the locking mechanism 162 in order to maintain the handle 106 and the base 104 or the container 110 in integral connection.

The locking region 170 comprises two holes 171 and 172. The hole 171 is used for interaction between the core 160 and the locking mechanism 162, and the hole 172 is used for joining with the cover 164 and as support for the spring 186.

Finally, as a continuation of the joining region 166, the core 160 has a gripping region 174, which has two apertures 175 and 176.

The aperture 175 allows the handle 106 to be made lighter and serves to receive part of the cover 164. The aperture 176 is similar to the aperture 32 and serves for hanging the handle from a hook.

The locking mechanism 162 comprises a button 178 integral with a rod 180, as well as an arm 182 which has a groove 184 which houses a spring 186.

The locking mechanism 162 operates as follows: when the fingers 169 and 170 are introduced into the cut-outs 131 and 132 (or the cut-outs 149 and 150), by a downward movement, the arm 182 comes into contact with an end of the second portion 128 (or of the element 148).

As the fingers 169 and 170 advance and the handle 106 is lowered, the arm 182 is urged in the direction of resistance of the spring 186, which it compresses. The spring 186 is limited in its movement by a stop 188 protruding from the hole 172.

When the fingers 169 and 170 are fully engaged and the handle 106 is fully depressed, the end of the second portion 128 (or of the element 148) is fully housed in the stamped portion 168, and the arm 182 then moves violently in the opposite direction under the effect of the release of the spring 186.

The arm is then situated beneath the end of the second portion 128 (or of the element 148), while the fingers 169 and 170 engage therewith from above, which creates a pincer-type connection.

When the container 110 is received in the base 104, the stamped portion 168 covers the end of the lug 144, as can be seen in FIG. 12.

The rod 180 is integral with the arm 182, which allows the locking mechanism 162 to be unlocked. In fact, the button 178 simply has to be pulled in order for the arm 182 to move back and compress the spring 186, until the arm is no longer beneath the end of the second portion 128 (or of the element 148).

It is then simple to detach the handle 106 by lifting it and disengaging the fingers 169 and 170.

In the example described here, the cover 164 is made of silicone, which allows a good grip to be obtained while offering excellent heat insulation. In other embodiments, the cover 164 can be made of plastics material, silicone or metal.

Figure 10:
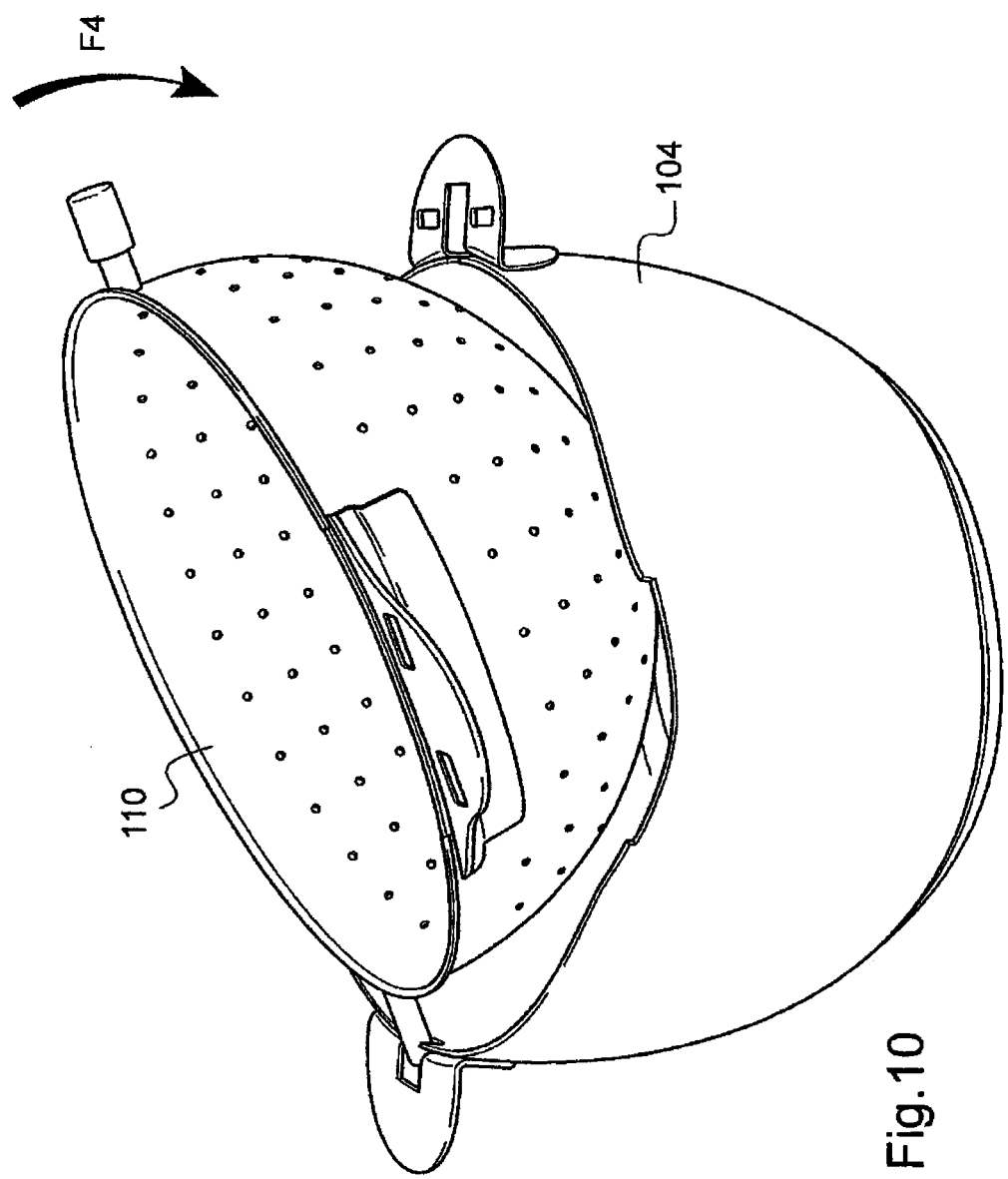
FIG. 10 shows a perspective view of a first step of the assembly of the utensil of FIG. 5.

FIG. 10 shows an example of the placing of the container 110 in the base 104. As can be seen, it is appropriate first to introduce the lug 145 into the notch 129 until it is lodged partly in the opening 121 and partly beneath the second surface 127 of the loop handle 123.

Then, in a movement according to an arrow F4, the container 110 can be lodged in the space 118, the lug 144 being lodged in the notch 130 of the loop handle 124 and in the opening 122.

FIG. 11 shows the fitting of the handle 106 to the assembly comprising the base 104 and the container 110. As stated above, the fingers 169 and 170 are introduced into the cut-outs 131 and 132, and the handle is lowered according to an arrow F5 until a clicking sound is heard, which corresponds to the release of the spring 186.

Finally, FIG. 12 shows the use of the utensil 102 for draining off water. Once the handle 106 has been locked, it simply has to be turned according to an arrow F6 in order to turn the base 104, while the container 110 remains upright on account of gravity.

Since the lug 144 is maintained at the level of the handle 106 and the lug 145 is maintained at the level of the second surface 127, the base 104 and the container 110 are then in a rotational relationship according to the axis passing through the lugs 144 and 145.

Finally, if the handle is turned in the opposite direction to the arrow F6, it will be noted that the container 110 and the base 104 remain connected because the element 148 remains supported on the spout 134, which allows the contents of the container 110 easily to be poured into a dish.

It will be noted that, if the element 148 is located in an opposite manner to that shown here, the directions mentioned above are reversed, but the operation remains the same.

FIG. 13 shows a second container 190 received in the base 104. In this embodiment, the container 190 does not have holes and the utensil 192 therefore forms a bain-marie.

Under these conditions, it may be valuable to block the container 190 in terms of rotation when it is being held by the handle 106. This allows, for example, the contents of the container 190 to be emptied out once the boiling water has been drained off.

To that end, the loop handle 122 is modified slightly in order to add a lock 194. The lock 194 comprises a knob 196 which is connected by a rod (not shown) to a latch 198 through an opening in the opening 200 of the loop handle 122. Accordingly, the latch 198 can be turned by means of the knob 196 so that it becomes lodged on the rim of the base 104.

Advantageously, the lock 194 can comprise a return spring, which urges the latch 198 towards the knob 196, which reinforces the holding of the lock 194 when it is engaged and prevents it from being locked accidentally when it is not engaged.

FIG. 14 shows a partially cutaway front view of the utensil of FIGS. 5 and 13, allowing the relative dimensions of the container and of the base to be explained.

As can be seen in this figure, the parameters allowing the dimensions to be defined are as follows:
Rins, the inside radius of the base,
a, the outside radius of the container,
J1, the radial spacing between the container and the base in the region of the rim of the base,
J2, the vertical spacing between the container and the bottom of the base,
H, the height of the base, and
Z, the distance between the height of the container.

In light of these parameters, the applicant has identified two equations which define the relative dimensions of the container and of the base:

$$a^2 = (Rins - J1)^2 + Z^2 \text{ and } H \geq J2 + Z + a.$$

These equations are provided for the following ranges:
J1 from 0.2 cm to 5 cm,
J2 from 0.2 cm to 5 cm, and
Z from −2 cm to 2 cm (the container can be above or below the top plane of the base).

Although the examples described here relate to handles of generally elongate shape, the handles may also have a shorter form in the manner of a loop handle and be arranged symmetrically around the wall, for use as a stewpot, for example.

Although the base 4 has been described in the particular form of a saucepan, it must be appreciated that the base 4 can be in the form of any other cylindrical container for culinary use.

In addition to the applications described above, solely by way of example, it is possible to envisage implementing the invention in the form of a steamer or deep fryer, inter alia.

The preceding description has been made in relation to two distinct embodiments. The person skilled in the art will recognise that numerous variants of form, of materials and of functions can be shared by these two embodiments, and he will be able to use them when advantageous.

What is claimed is:

1. A utensil comprising
   a pan including a pan wall, an open pan cavity with a rim thereabout defined by the pan wall and a handle assembly, the pan wall having two through-openings with coincident centerlines, at least one of the through-openings including a notch extending to the rim;
   a container including a container wall defining an open inner cavity and two lugs extending outwardly from the container with coincident centerlines, the two lugs being positionable through the two through-openings, respectively, and the container being sized to pivot without interference within the open pan cavity with the two lugs positioned through the two through-openings, the handle assembly being operatively positionable over the lug in the through-opening with the notch to retain the container with the two lugs positioned in the two through-openings.

2. The utensil of claim 1, the handle assembly further including an elongate handle fixed at one end to the pan wall, a movable element and an extension of the notch to receive a first of the two lugs, the movable element being a sleeve slidable on the elongate handle to extend into and retract from position over the first lug when received in the extension of the notch.

3. The utensil of claim 2, the sleeve being further slidable to extend into an engagement with the container wall displaced from the centerline of the first lug.

4. The utensil of claim 3, the container wall having holes therethrough.

5. The utensil of claim 1, the pan further including at least one loop handle extending laterally of the pan, the first of the at least one loop handle being aligned with the notch, the handle assembly including an elongate handle and a releasable engagement with the first of the at least one loop handle, the elongate handle being positioned over the notch with engagement of the handle assembly with the loop handle.

6. The utensil of claim 5, the container further including a container loop handle, the releasable engagement also being engageable with the container loop handle.

7. The utensil of claim 6, the container wall having holes therethrough.

8. A utensil comprising
   a pan including a pan wall, an open pan cavity with a rim thereabout defined by the pan wall, two loop handles extending laterally from the pan, and a handle assembly, the handle assembly including an elongate handle and a releasable engagement with a first of the two loop handles, the pan wall having two through-openings with coincident centerlines, at least one of the through-openings including a notch extending to the rim, the first of the two loop handles being aligned with the notch;
   a container including a container wall defining an open inner cavity, two lugs extending outwardly from the container with coincident centerlines and a container loop handle, the two lugs being positionable through the two through-openings, respectively, and the container being sized to pivot without interference within the open pan cavity with the two lugs positioned through the two through-openings, the handle assembly being operatively positionable over the lug in the through-opening with the notch to retain the container with the two lugs positioned in the two through-openings and with engagement of the handle assembly with the first loop handle, the releasable engagement also being engageable with the container loop handle.

9. The utensil of claim 8, the pan further including a spout formed in the rim, the container loop handle being directly aligned with the spout with the two lugs positioned in the two through-openings.

10. The utensil of claim 9, the container wall having holes therethrough.

* * * * *